Patented Oct. 27, 1936

2,058,406

UNITED STATES PATENT OFFICE 2,058,406

METHOD OF PREPARATION OF CARBOCYANINE DYES

Leslie G. S. Brooker and Frank L. White, Rochester, N. Y., assignors, by mesne assignments, to Eastman Kodak Company, Jersey City, N. J., a corporation of New Jersey No Drawing. Application July 27, 1934, Serial No. 737,274

9 Claims. (Cl. 260—44)

This invention relates to a new method of preparation of carbocyanine dyes and more particularly to carbocyanine dyes containing a methyl group attached to the central carbon atom of the three-carbon chain.

Carbocyanine dyes containing a methyl group attached to the central group atom of the three-carbon chain have been made the subjects of various patent applications. For instance, the dye known as 2,2'-diethyl-8-methyl-3,4,3',4'-dibenzothia-carbocyanine is described in the United States Patent No. 1,846,301, 8-methyloxacarbocyanines are described in the United States Patent No. 1,962,124 and 8-methylselenocarbocyanines are the subject of a copending application Serial No. 559,777. These dyes are useful as photographic sensitizers.

The above-mentioned dyes have been made by various methods which have in common the use of an alkyl orthoacetate, for instance, ethyl orthoacetate. The new method of preparation herein described has an advantage in that the ethyl orthoacetate of earlier preparations is dispensed with.

The object of this invention is to provide a new process for the preparation of carbocyanine dyes containing a methyl group attached to the central carbon atom of the three-carbon chain, which dispenses with the use of an alkyl orthoacetate. Further objects will appear hereinafter.

This new method of synthesis may be illustrated in the case of 2,2'-diethyl-8-methylthiacarbocyanine iodide. In order to prepare this salt, 1-methylbenzothiazole ethiodide may be heated under suitable conditions to be described later and the dye is formed. The reaction which takes place may be represented as follows:

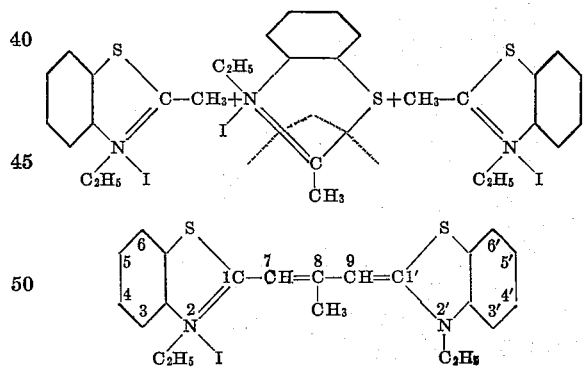

Three molecules of a quaternary salt are shown reacting together and one molecule probably undergoes fission as shown by the dotted line giving rise to an ethenyl group ($CH^3C\equiv$) which serves to link together the other two heterocyclic nuclei and thereby becomes the central part of the dye molecule.

The reaction may be carried out in the above case by heating the quaternary salt in pyridine for several hours, but the yield is poor. The yield is improved by using the etho-p-toluenesulfonate of the base for the reaction, followed by subsequent conversion of the p-toluenesulfonate of the dye to the iodide by double decomposition in the usual way. If alpha-picoline is used as solvent, the yield is again somewhat higher.

The yield is still further improved by heating the quaternary salts of the base in pyridine solution with the addition of triethylamine or piperidine or the like in suitable amounts such as two or three mols of the strong base to every three mols of quaternary salt taken. Thus, when the ethiodide of the base (3 mols) is heated in pyridine solution with triethylamine (3 mols) for one half hour, a yield upwards of 50% is obtained. If piperidine (2 mols) is used, the yield is about 50%.

One of the lower alcohols, such as ethyl alcohol or n-propyl alcohol, may be chosen as solvent in conjunction with one of the strong bases mentioned. Yields in this case of around 30% are obtained.

The reaction will also proceed at the ordinary temperature, but slowly. However, it is convenient to use heat to accelerate the reaction.

The reaction is not confined to salts of 1-methyl-benzothiazole, but 8-methyl dyes from 1-methyl-alpha-naphthothiazole and 2-methyl-beta-naphthothiazole may be prepared in similar fashion. Also salts of 1-methyl-benzoselenazole may be used as well as salts of 1-methylbenzoxazole. In the latter case, n-propyl alcohol may be used as a solvent. Examples of the use of salts of all of the bases named are given.

It will be realized that the essential part of the present invention is the decomposition of one molecule of an alkyl quaternary salt of a heterocyclic nitrogen base containing a reactive methyl group with formation of a residue which provides an ethenyl group which in turn serves to link together two more heterocyclic nuclei to yield an 8-methylcarbocyanine dye. Various methods are given for bringing about this reaction, all of which fall within the scope of this invention.

The quaternary salts which undergo the reaction may be given the general formula:

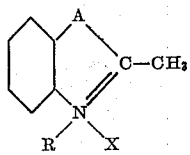

wherein R equals an alkyl group such as methyl, ethyl, or n-propyl, A equals an oxygen, a sulfur or a selenium atom and X equals an acid radical such as halide, p-toluenesulfonate or alkyl sulfate. The benzene nucleus shown may contain substituent groupings, such as alkyl, alkoxy and the like, or a second benzene nucleus may be fused on, giving salts such as those of the methylnaphthothiazoles.

A number of examples of the 8-methylcarbocyanines which have been prepared by the method described will now be presented. These examples are representative of the several similar preparations which could be devised, wherein the proportions used would vary in accord with the particular dye being prepared. They are not intended to limit the scope of this invention.

In the examples, it is preferable to use carefully dried and then freshly distilled reagents.

*Example I.—2,2'-diethyl-8-methylthiacarbocyanine iodide*

9.15 parts of 1-methylbenzothiazole ethiodide are refluxed with 70 parts of pyridine for 6 hours. The hot reaction mixture is allowed to cool. 120 parts of ether are added to precipitate the dye and the residue is thoroughly washed with water to remove unchanged quaternary salt. The dye is purified by treatment with acetone and consists of coppery crystals. The dye may be recrystallized from methyl alcohol. If the 70 parts of pyridine above are replaced by 30 parts of pyridine plus 3.03 parts of triethylamine and the period of heating is reduced from 6 hours to one-half hour, the yield of dye is considerably increased. The 3.03 parts of triethylamine may be replaced by 1.7 parts of piperidine.

The triethylamine or piperidine used above may be replaced by N-methylpiperidine, diethylamine or guanidine carbonate. Other quaternary salts which may be used are 1,5-dimethylbenzothiazole ethiodide, 1,3-dimethylbenzothiazole ethoethyl sulfate, or 5-ethoxy-1-methylbenzothiazole ethiodide. These salts will, of course, yield dyes with substituents in the benzene nuclei.

2,2'-diethyl-8-methylthiacarbocyanine iodide is also obtained when 10.5 parts of 1-methylbenzothiazole etho-p-toluene-sulfonate are refluxed with 15 parts of pyridine for three hours, the dye precipitated from the reaction mixture by adding 120 parts of ether and the residue dissolved in 20 parts of methyl alcohol and precipitated as the iodide by adding excess of aqueous potassium iodide. The dye is purified by treatment with acetone. If 15 parts of alpha-picoline are used instead of the 15 parts pyridine given above, the rest of the procedure being as stated, the yield is somewhat higher. If 2.05 parts of triethylamine are used in addition to the 15 parts of pyridine employed above and the period of refluxing is reduced to 30 minutes, the yield of dye is still higher. These 2.05 parts of triethylamine may in turn be replaced by 1.7 parts of piperidine, and the reaction mixture heated for 30 minutes.

The dye is also obtained when 10.5 parts of 1-methyl-benzothiazole etho-p-toluenesulfonate are refluxed with 12 parts of absolute ethyl alcohol and 2.02 parts of triethylamine for 90 minutes followed by double decomposition as above.

*Example II.—2,2',8-trimethylthiacarbocyanine iodide*

8.73 parts of 1-methylbenzothiazole methiodide are refluxed for three hours with 35 parts of pyridine and 3.03 parts of triethylamine. The dye is isolated as indicated in Example I.

*Example III.—2,2'-diethyl-8-methyl-3,4,3',4'-dibenzothiacarbocyanine bromide*

12 parts of 2-methyl-beta-naphthothiazole etho-p-toluenesulfonate are refluxed for 10 minutes with 15 parts of pyridine and 2.02 parts of triethylamine. 120 parts of ether are added and the residue dissolved in 20 parts of hot methyl alcohol, and the dye precipitated as the bromide by adding an excess of warm aqueous potassium bromide. After washing with hot water, the residue is purified by treatment with acetone, and further purified by recrystallization from methyl alcohol.

*Example IV.—2,2'-diethyl-8-methyl-5,6,5',6'-dibenzothiacarbocyanine iodide*

12 parts of 1-methyl-alpha-naphthothiazole etho-p-toluenesulfonate are refluxed for 15 minutes with 20 parts of pyridine and 2.02 parts of triethylamine. The dye, after conversion to the iodide, is isolated as described in the preceding example.

*Example V.—2,2'-diethyl-8-methylselenacarbocyanine iodide*

5.28 parts of 1-methylbenzoselenazole ethiodide are refluxed for 30 minutes with 15 parts of pyridine and 1.52 parts of triethylamine. The dye is precipitated with 120 parts of ether, the residue well washed with water and purified by treatment with acetone.

*Example VI.—2,2'-diethyl-8-methyloxacarbocyanine iodide*

8.67 parts of 1-methylbenzoxazole ethiodide are refluxed for 30 minutes with 15 parts of n-propyl alcohol and 3.03 parts of triethylamine. The dye is isolated by the method given in the previous example.

We consider as included in our invention all such modifications and equivalents as are included within the scope of the appended claims.

What we claim as our invention and desire to obtain by Letters Patent of the United States is:

1. A process for the preparation of an 8-methylcarbocyanine salt which comprises condensing, in the presence of an organic base, three molecules of a quaternary salt of a heterocyclic nitrogen-containing base of the following structure:

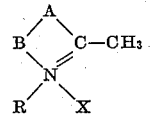

wherein R equals an alkyl group, A equals an atom selected from the group consisting of oxygen, sulfur, selenium, B equals an arylene radical selected from the group consisting of a phenylene and a naphthylene, and X equals an acid radical.

2. A process for the preparation of an 8-methylcarbocyanine iodide which comprises condensing, in the presence of an organic base, three molecules of an alkiodide of a heterocyclic nitrogen-containing base of the following structure:

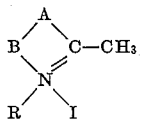

wherein R equals an alkyl group, A equals an atom selected from the group consisting of oxygen, sulfur, selenium, and B equals an arylene radical selected from the group consisting of a phenylene and a naphthylene.

3. A process for the preparation of an 8-methylcarbocyanine iodide which comprises condensing, in the presence of pyridine, three molecules of an alkiodide of a heterocyclic nitrogen-containing base of the following structure:

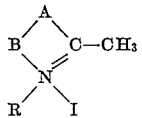

wherein R equals an alkyl group, A equals an atom selected from the group consisting of oxygen, sulfur, selenium, and B equals an arylene radical selected from the group consisting of a phenylene and a naphthylene.

4. A process for the preparation of an 8-methylcarbocyanine iodide which comprises condensing, in the presence of pyridine and a stronger organic base, three molecules of an alkiodide of a heterocyclic nitrogen-containing base of the following structure:

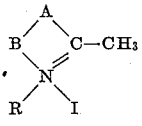

wherein R equals an alkyl group, A equals an atom selected from the group consisting of oxygen, sulphur, selenium, and B equals an arylene radical selected from the group consisting of a phenylene and a naphthylene.

5. A process for the preparation of an 8-methylcarbocyanine iodide which comprises condensing, in the presence of pyridine and triethylamine, three molecules of an alkiodide of a heterocyclic nitrogen-containing base of the following structure:

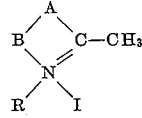

wherein R equals an alkyl group, A equals an atom selected from the group consisting of oxygen, sulphur, selenium, and B equals an arylene radical selected from the group consisting of a phenylene and a naphthylene.

6. A process for the preparation of an 8-methylcarbocyanine iodide which comprises condensing, in the presence of an organic base, three molecules of an alkylo-p-toluenesulphonate of a heterocyclic nitrogen-containing base of the following structure:

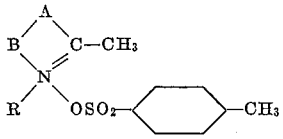

wherein R equals an alkyl group, A equals an atom selected from the group consisting of oxygen, sulphur, selenium and B equals an arylene radical selected from the group consisting of a phenylene and a naphthylene, followed by dissolving the alkylo-p-toluenesulphonate thus obtained in methyl alcohol and precipitating the dye as the corresponding iodide by adding an aqueous solution of a soluble iodide.

7. A process for the preparation of an 8-methylcarbocyanine iodide which comprises condensing, in the presence of pyridine, three molecules of an alkylo-p-toluenesulphonate of a heterocyclic nitrogen-containing base of the following structure:

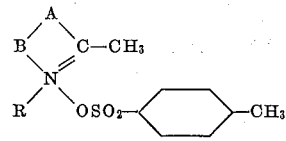

wherein R equals an alkyl group, A equals an atom selected from the group consisting of oxygen, sulphur, selenium and B equals an arylene radical selected from the group consisting of a phenylene and a naphthylene, followed by dissolving the alkylo-p-toluenesulphonate thus obtained in methyl alcohol and precipitating the dye as the corresponding iodide by adding an aqueous solution of potassium iodide.

8. A process for the preparation of an 8-methylcarbocyanine iodide which comprises condensing, in the presence of pyridine and a stronger organic base, three molecules of an alkylo-p-toluenesulphonate of a heterocyclic nitrogen-containing base of the following structure:

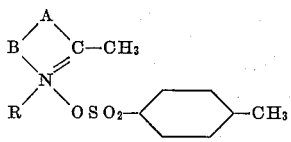

wherein R equals an alkyl group, A equals an atom selected from the group consisting of oxygen, sulphur, selenium and B equals an arylene radical selected from the group consisting of a phenylene and a naphthylene, followed by dissolving the alkylo-p-toluenesulphonate thus obtained in methyl alcohol and precipitating the dye as the corresponding iodide by adding an aqueous solution of potassium iodide.

9. A process for the preparation of an 8-methylcarbocyanine iodide which comprises condensing, in the presence of pyridine and triethylamine, three molecules of an alkylo-p-toluenesulphonate of a heterocyclic nitrogen-containing base of the following structure:

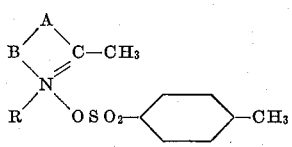

wherein R equals an alkyl group, A equals an atom selected from the group consisting of oxygen, sulphur, selenium and B equals an arylene radical selected from the group consisting of a phenylene and a naphthylene, followed by dissolving the alkylo-p-toluenesulphonate thus obtained in methyl alcohol and precipitating the dye as the corresponding iodide by adding an aqueous solution of potassium iodide.

LESLIE G. S. BROOKER.
FRANK L. WHITE.